(12) United States Patent
Lee

(10) Patent No.: US 6,246,883 B1
(45) Date of Patent: Jun. 12, 2001

(54) MOBILE BASE STATION

(75) Inventor: David Y. Lee, Randolph, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 08/777,989

(22) Filed: Dec. 24, 1996

(51) Int. Cl.[7] .................................................. H04B 7/15
(52) U.S. Cl. ..................... 455/507; 455/11.1; 455/412; 340/870.02; 340/870.11; 340/870.15
(58) Field of Search ............................. 455/11.1, 16, 24, 455/517, 524, 525, 550, 561, 562, 575, 9, 23, 20, 410, 412, 414, 422, 426, 434, 436, 455, 22; 340/870.02, 870.03, 870.07–870.08, 870.11–870.12, 870.13, 870.15, 870.18, 870.26

(56) References Cited

U.S. PATENT DOCUMENTS

| | | |
|---|---|---|
| 4,121,158 | 10/1978 | Hanni . |
| 4,539,706 * | 9/1985 | Mears et al. ..................... 455/11.1 |
| 5,194,860 * | 3/1993 | Jones et al. ..................... 340/870.02 |
| 5,339,316 | 8/1994 | Diepstraten . |
| 5,371,738 | 12/1994 | Moelard et al. . |
| 5,423,067 | 6/1995 | Manabe . |
| 5,438,329 * | 8/1995 | Gastouniotis et al. .......... 340/870.02 |
| 5,463,623 | 10/1995 | Grimes et al. . |
| 5,490,284 * | 2/1996 | Itoh et al. ........................ 455/11.1 |
| 5,513,242 | 4/1996 | Mukerjee et al. . |
| 5,553,126 | 9/1996 | Tang . |
| 5,592,491 * | 1/1997 | Dinkins ............................ 455/11.1 |
| 5,628,049 * | 5/1997 | Suemitsu ......................... 455/11.1 |
| 5,729,826 * | 3/1998 | Gavrilovich ..................... 455/422 |
| 5,748,104 * | 5/1998 | Argyroudis et al. ............. 340/870.02 |
| 5,915,207 * | 6/1999 | Dao et al. ........................ 455/9 |

FOREIGN PATENT DOCUMENTS

| | | |
|---|---|---|
| 0537756 A2 | 4/1993 | (EP) . |
| WO 97/26724 | 7/1997 | (WO) . |

OTHER PUBLICATIONS

Gallager, Robert, Information Theory and Reliable Communication, John Wiley & Sons, Inc., p. 8, 1968.*
Kerr, Douglas, "Cellular Telephone Technology and Practice" Course Notes, pp. 2–5 and 2–6, 1994.*

* cited by examiner

Primary Examiner—Doris H. To
(74) Attorney, Agent, or Firm—Synnestvedt & Lechner LLP

(57) ABSTRACT

The mobil base station is disclosed having a computer readable storage medium for information and mobil wireless communication circuitry for performing wireless communication with a user in its broadcast area. In a complimentary configuration, the user has a terminal with a computer readable storage medium for storing information and terminal wireless communication circuitry for cooperating with the mobil wireless communication circuitry to facilitate wireless communication therebetween. The mobil base station performs a wireless transfer of information by moving to the user's particular geographical area such that its broadcast area includes the user's terminal. Using the mobil wireless communication circuitry and the terminal wireless communication circuitry, a wireless communication link is established. A transfer of information then occurs between the storage medium of the mobile base station and the storage medium of the terminal via the wireless communication link.

25 Claims, 5 Drawing Sheets

MOBILE BASE STATION

BACKGROUND OF THE INVENTION

1. Field of Invention

The present invention generally relates to wireless communication. More specifically, the present invention relates to a system and method for providing users with a wireless medium using a mobile or travelling base station.

2. Background

The advent of multimedia computer services now allows people to enjoy customized newspapers and magazines, educational programming, and other audio/visual media in the comfort of their own home or office. Although there is a strong demand for such services, deployment has been hampered by the wide bandwidth these products require for transmission. Conventional telephone lines and cellular systems typically support narrower bandwidths, and are inadequate to handle such transmissions. The enormous amount of information comprising these multimedia products tends to bog these systems down unacceptably or to overwhelm them completely resulting in incomplete transmissions. One possible solution is to bolster cellular systems infrastructures and increase the available RF bandwidths these systems are currently allotted. Such a solution, however, is costly and adds to the existing and vehement contention over bandwidth allocation. Consequently, a need exists for a system of delivering multimedia services to user without burdening existing infrastructures. The present invention fulfills this need among others.

SUMMARY OF THE PRESENT INVENTION

The invention relates to a system and method that employs a mobile base station for periodically travelling to a particular area and transmitting and/or receiving information to and/or from a user within the area. The mobil base station has storage means for storing information and mobil wireless communication means for performing wireless communication within its broadcast area. In a complimentary configuration, the user has a terminal with storage means for storing information and terminal wireless communication means for cooperating with the mobil wireless communication means to facilitate wireless communication therebetween. The method of performing a wireless transfer of information involves moving the mobile base station to the user's particular geographical area such that the broadcast area includes the user's terminal thereby enabling the mobil wireless communication means and the terminal wireless communication means to cooperate and establish a wireless communication link. Next, a direct wireless communication link is established between the mobile base station and the terminal of the user. A transfer of information then occurs between the storage means of the mobile base station and the storage means of the terminal via the wireless communication link. In a preferred embodiment, the wireless communication link is a wireless LAN interface for facilitating transmission of wide bandwidth information.

In accordance with the invention, the user can be provided with periodic access to an otherwise unavailable wireless medium without the need for an elaborate and costly wireless infrastructure.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, wherein like reference numerals identify like elements, and wherein:

DETAILED DESCRIPTION OF THE PRESENT INVENTION

Figure 1:
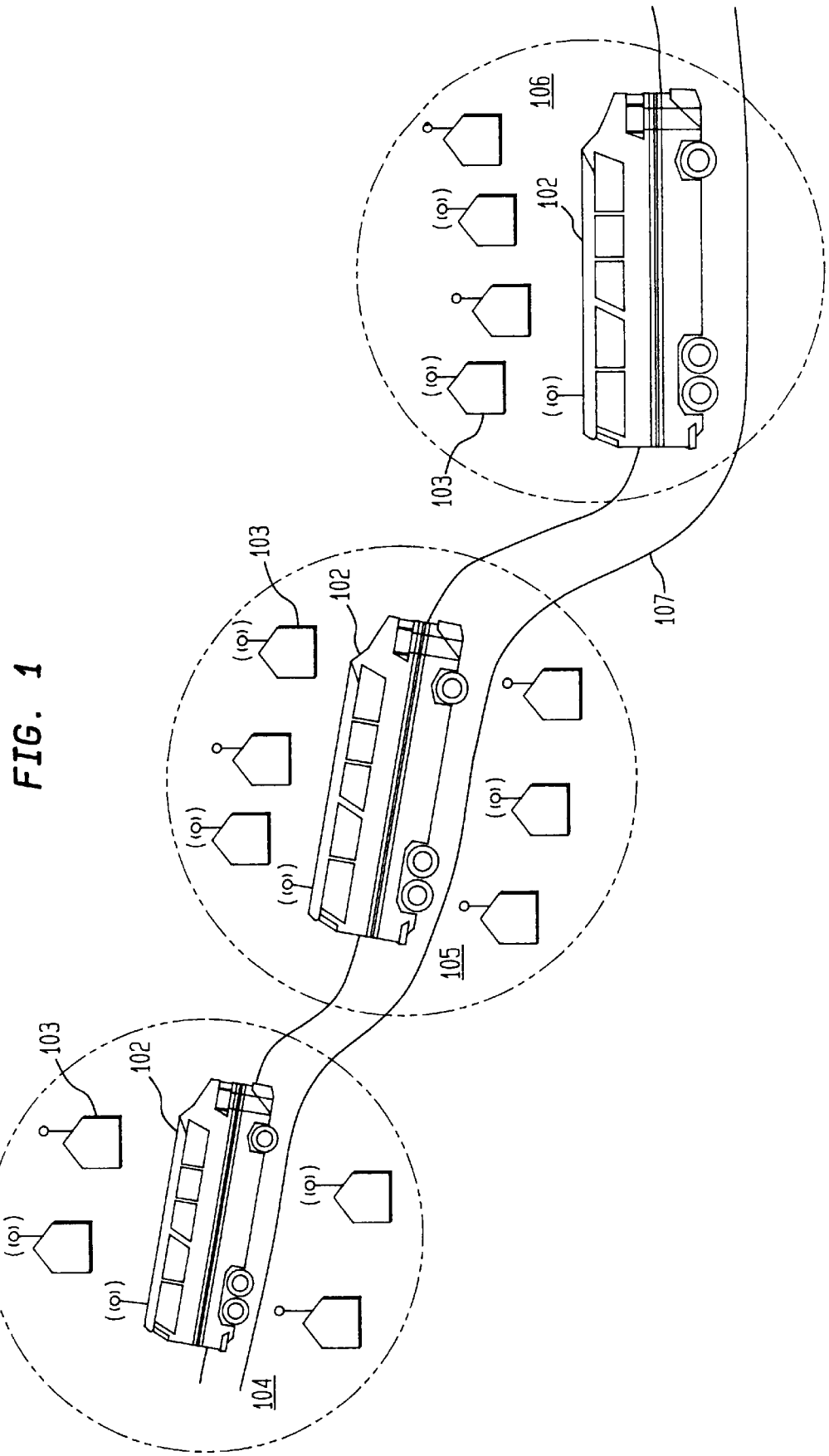
FIG. 1 shows a system employing a mobil base station to provide a wireless medium to users.

The invention relates to a system and method that employs a mobile base station for periodically travelling to a particular area and transmitting and/or receiving information to and/or from a user within the area. The mobil base station has storage means for storing information and mobil wireless communication means for performing wireless communication with a user in its broadcast area. In a complimentary configuration, the user has a terminal with storage means for storing information and terminal wireless communication means for cooperating with the mobil wireless communication means to facilitate wireless communication therebetween. The method of performing a wireless transfer of information involves moving the mobile base station to the user's particular geographical area such that the broadcast area includes the user's terminal thereby enabling the mobil wireless communication means and the terminal wireless communication means to cooperate and establish a wireless communication link. Next, a direct wireless communication link is established between the mobile base station and the terminal of the user. A transfer of information then occurs between the storage means of the mobile base station and the storage means of the terminal via the wireless communication link. The transfer may be from the mobile base station to the terminal, from the terminal to the mobil base station, or both.

The use of mobile base stations facilitates a broad range of wireless services that otherwise may be unavailable. The invention is particularly well suited for broad bandwidth information, such as multimedia products, which is beyond the capability or practical use of conventional cellular and wireless systems. Typical examples of multimedia products include newspapers, magazines, movies, entertainment, graphics, and educational programming. Often, these products are customized according to a geographical area or particularized interests for a particular reader or group of readers. According to the present invention, an early morning delivery truck (e.g., a bread truck) could travel to a particular area and download a personalized newspaper to a user's terminal.

Although well suited for broad bandwidth services, the invention may also facilitate wireless communication with users in areas that are beyond the reach of traditional cellular networks for reasons such as remoteness, interference or obstruction. In such areas, it may not be cost effective to develop a cellular infrastructure to support wireless services. The present invention obviates problems of remoteness, interference or obstruction by using mobile base station that periodically travel to these remote areas and transmit and receive wireless information. For example, a U.S. Mail truck may be outfitted with a wireless communication unit. As it travels along its appointed route, it may exchange wireless information such as E-mail.

Another approach in reaching users who might otherwise be deprived of conventional cellular services is to use the mobile base station as a repeater. To extend the size of the cell or reach terminals obstructed from the base station, frequently repeaters or reradiators are used. These devices are typically fixed and operate continuously. It may be advantageous in certain instances, however, to use a mobile base station equipped with a more powerful antenna than used by user terminals to act as a mobil repeater or reradiator. Using a mobile base station avoids the expense of erecting permanent repeater stations, especially if the repeater is only needed for certain periods of the day, e.g., rush hour. Additionally, if sufficient and reliable mobile base station traffic exists in an area to provide for continuous mobile base station hand-offs, then continuous wireless services may be provided using a series of mobil base stations.

In yet another application, the present invention may be used to automate tasks that require periodically gathering or disseminating information in a particular geographic location. For example, it may be advantageous for a mobile base station to obtain meter readings, e.g., gas meter readings, and other data from users along its appointed route. This information may then be transmitted to a user desiring the information, e.g., the gas utility, along the mobile base station's route.

Therefore, it should be apparent that the present invention may be practiced in a variety of ways to provide previously unavailable wireless services to a set of users. The system and method of the invention are considered in more detail below.

A suitable system 100 is depicted in FIG. 1. The main component of the system 100 is a mobile base station 102 which is configured to serve user terminals 103 within its broadcast area. As the mobile base station moves, the broadcast area changes as does the users served therein. In FIG. 1, for example, the mobile base station 102 sequentially serves areas 104, 105 and 106, and the users contained therein, as it travels down a path 107.

A mobile base station according to the present invention includes any vehicle capable of locomotion having a mobil wireless communication unit. The type of vehicle is irrelevant, however, it may be preferred to use vehicles, such as delivery, municipal or public transportation vehicles, which are already scheduled to travel to certain geographic areas to perform another task. These vehicles could be fitted with a mobil wireless communication unit to provide a wireless link for exchanging information with a user while temporary in its proximity.

Figure 2:
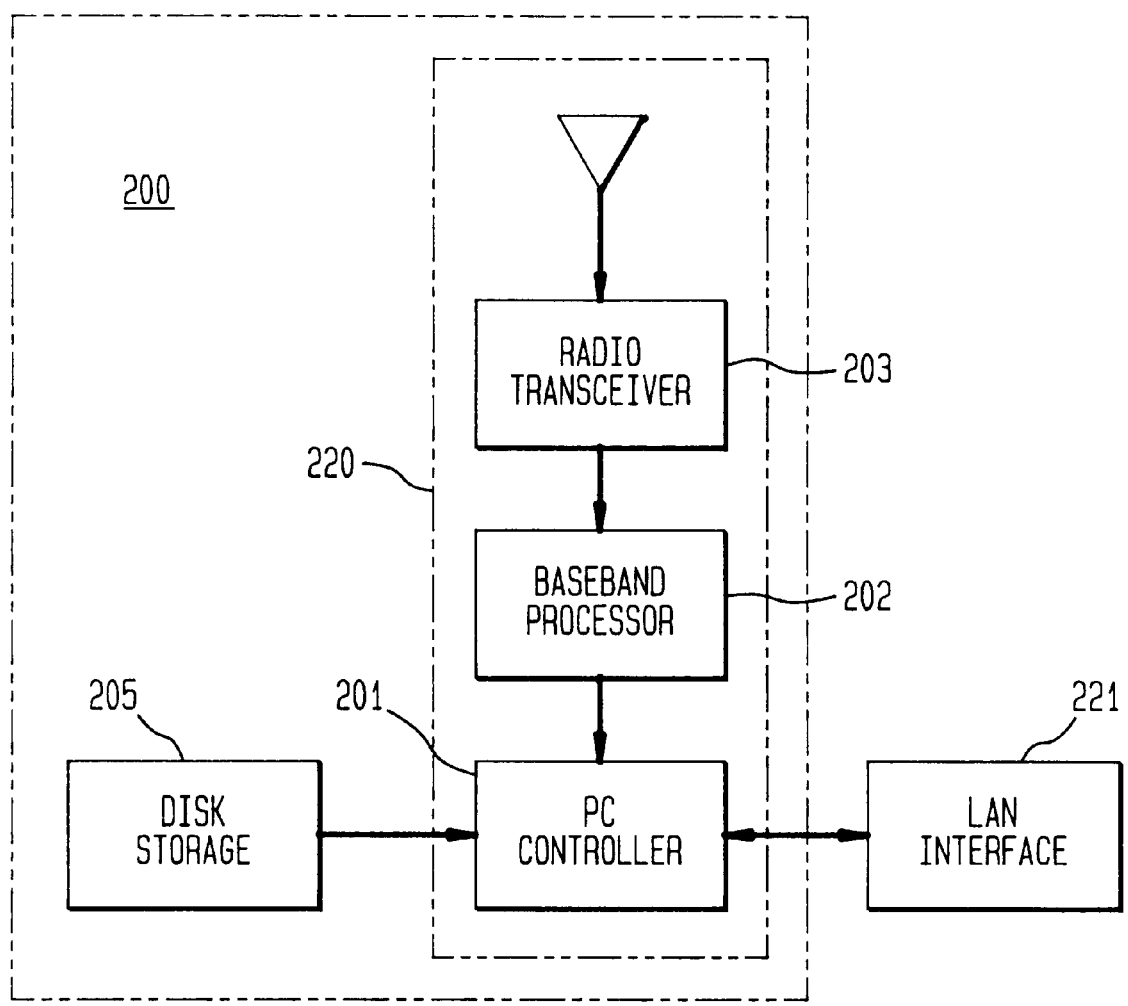
FIG. 2 shows a schematic diagram of the mobil communication unit.

A suitable mobile wireless communication unit 200 is depicted schematically in FIG. 2. The essential function of the unit is to communicate with the terminal using mobil wireless communication means 220. The technology employed by the mobil wireless communication means 220 depends upon the services provided. For example, if the link is used for narrow bandwidth information, then a conventional cellular phone and modem may be adequate. On the other hand, if the link is used for multimedia, or other services requiring wide bandwidth, it may be beneficial to use a wireless LAN interface 221. Wireless LAN interfaces are preferred because of their higher operating speed and ability to transmit and receive large amounts of information quickly. Such wireless network interfaces are known in the art, and a review of the various products and technologies available is provided in Padraic R. Boyle, *Wireless LANS: Free to Roam*, PC MAGAZINE 175–204 (Feb. 20, 1996). Conventional technologies for wireless data transfer include frequency hopping spread spectrum (FHSS) and direct sequencing spread spectrum (DSSS) over radio or infra-red frequencies. The preferred techniques are spread spectrum technologies operating in the ISM (industrial, scientific and medical) bands of the electromagnetic spectrum.

In this embodiment, the mobil communication means 220 comprises a central computer controller 201 which in turn is operatively connected to a baseband processor 202. Connected to the base band processor 202 is a radio receiver 203. The controller 201, baseband processor 202 and radio receiver 203 cooperate to convert the analog waveform between RF and baseband frequency and to modulate/demodulate between digital data and analog signals when receiving and transmitting signals. These components may even perform and control channel coding and frame interleaving functions. The components used to perform these communication functions are well known in the art and are commercially available.

In one preferred embodiment, the computer controller is also operatively connected to storage means 205. Storage means may be any computer recognizable storage medium such as a disk, tape, CD, ROM or RAM. The storage means stores information for broadcast to the terminals, or information received from the terminals. It may also be preferred to equip the unit 100 with a conventional wireline LAN interface operatively connected to the computer controller 201. The wireline LAN interface facilitates communication between the mobile base station and an information depot (discussed below).

A user terminal according to the present invention broadly refers to any wireless device used by a user to receive and transmit signals in a wireless system. The terminal has a terminal wireless communication means configured to cooperate with the mobil wireless communication means to facilitate wireless communication between the terminal and the mobile base station. Suitable terminals are well known in the art and include cellular handsets and computers with wireless modems or wireless LAN interfaces.

Figure 3:
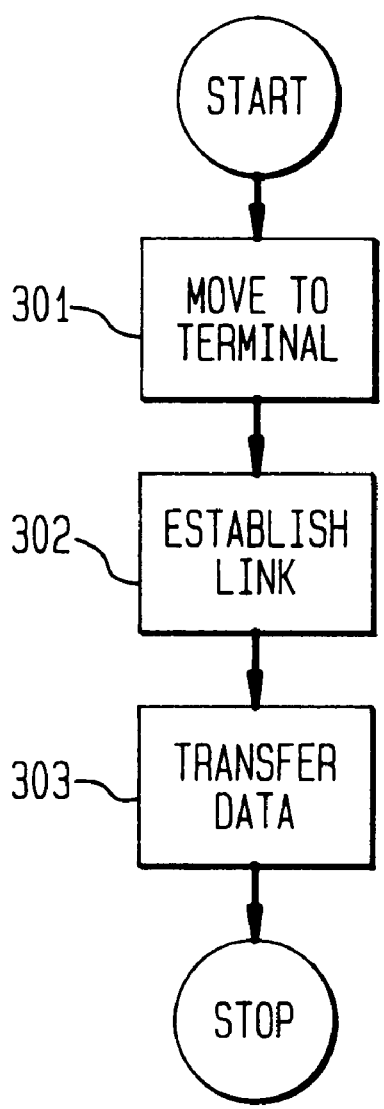
FIG. 3 shows a basic flow diagram of a preferred method embodiment of the invention.

The system 100 operates in accordance with the basic method depicted in FIG. 3. As shown in Block 301, the mobile base station moves to a particular geographical area containing a user terminal. The mobile base station moves within a certain proximity of the user terminal such that the mobile base station's broadcast area includes the terminal. This proximity allows the mobil wireless communication means to cooperate with the terminal wireless communication means. Next, in Block 302, a wireless communication link is established between the mobile base station and the terminal. Finally, information is transmitted between the mobile base station and the terminal via the wireless communication link as shown in Block 303.

Specific embodiments of the present invention will now be considered in light of the basic system and method discussed above. These embodiments should not be construed to limit the scope of the invention.

When considering the method and system of the present invention, the analogy between it and a conventional cellular network should noted and understood. In a conventional network, a mobile switching center (MSC) controls a fixed base station in a cell site via a landwire, and the base station serves a set of mobil terminal units. The system of the present invention, however, uses mobil or travelling base stations to serve a fixed user base. Nevertheless, the basic situation of a mobil point communicating with a stationary point is common to both. Therefore, the protocols and technologies used for facilitating such communication remain fundamentally the same and are hereby incorporated into the embodiments of the present invention. Such technologies include but are not limited to Advanced Mobile Phone System (AMPS), General System for Mobil Communications (GSMC), Personal Digital Cellular (PDC), Time Diversity Multiple Access (TDMA) and Code Division Multiple Access (CDMA).

Figure 4:
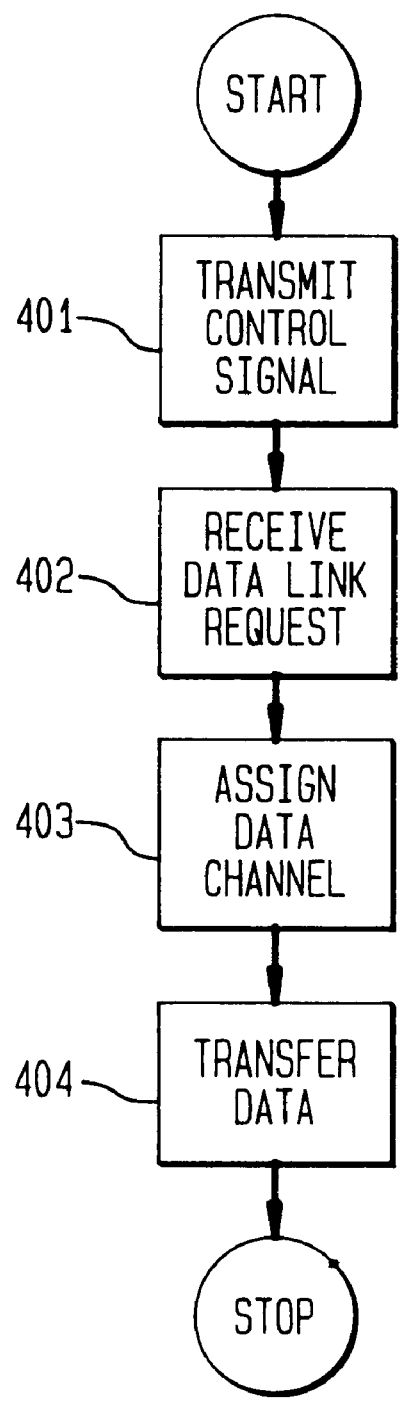
FIG. 4 shows a flow diagram of establishing a wireless communicative link as depicted in FIG. 3.

The process of establishing a communicative link in Block 302 of FIG. 3 represents important aspect of the system. A preferred embodiment of the process is shown in FIG. 4. In that embodiment, the mobil station transmits a control signal to the terminal in Block 401. The control signal typically contains identification of the base station and may contain other information such as available services if appropriate. In the preferred embodiment, this signal comprises a pilot signal. The attributes of a pilot signal may vary, although a preferred pilot signal is transmitted by each mobile station and is used as a coherent carrier reference for demodulation by all user terminals. It is transmitted at a relatively higher level than other types of signals which allows for extremely accurate tracking. Using known cellular protocol techniques, the user terminal may obtain synchronization with the nearest mobile base station without knowing the identity of the mobile base station. After synchronization, the pilot signal is used as a coherent carrier phase reference for demodulation of the other signals from this mobile base station. The pilot signal technology is well known in the art and is described in for example CDMA Network Engineering Handbook, Volume 1: Concepts in CDMA, Nov. 23, 1992, which is incorporated herein by reference.

After acknowledging the pilot signal, the user terminal submits a request for a data communication link. Referring back to FIG. 4, in Block 402, the mobile base station receives a data link request from the terminal. The data link request may also contain user identification and other "sign-on" information. Once logged in, the mobile base station then instructs the terminal which data channel to use in Block 403. With the data channel established between the mobile base station and the terminal, data then can be transferred therebetween in Block 404 according to the request of either the terminal or mobile base station. Table 1 shows a preferred sequence of transmission between the mobile base station and the terminal. It should be understood, however, that variations are possible in this protocol, for example, the roles of the mobil base station and the terminal may be reversed.

TABLE 1

| Row | Mobile Base Station | Channel | Fixed User |
|---|---|---|---|
| 1 | Broadcast pilot and control information (e.g., base station ID, available service) | Control ---> | Detect pilot and read control information |
| 2 | Verify user information against data base | Control <--- | Transmit sign-on information (e.g., user ID) |
| 3 | Acknowledge and inform user which traffic channel to use | Control ---> | Switch to traffic channel |
| 4 | Retrieves data from storage | Data <--- | Send details of service request |
| 5 | Prepare data for transfer, send data over the air and wait for acknowledgement until end of tranfer or out of signal coverage range | Data <---> | Receive data and send acknowledgement until end of transfer or out of signal coverage range |

Figure 5:
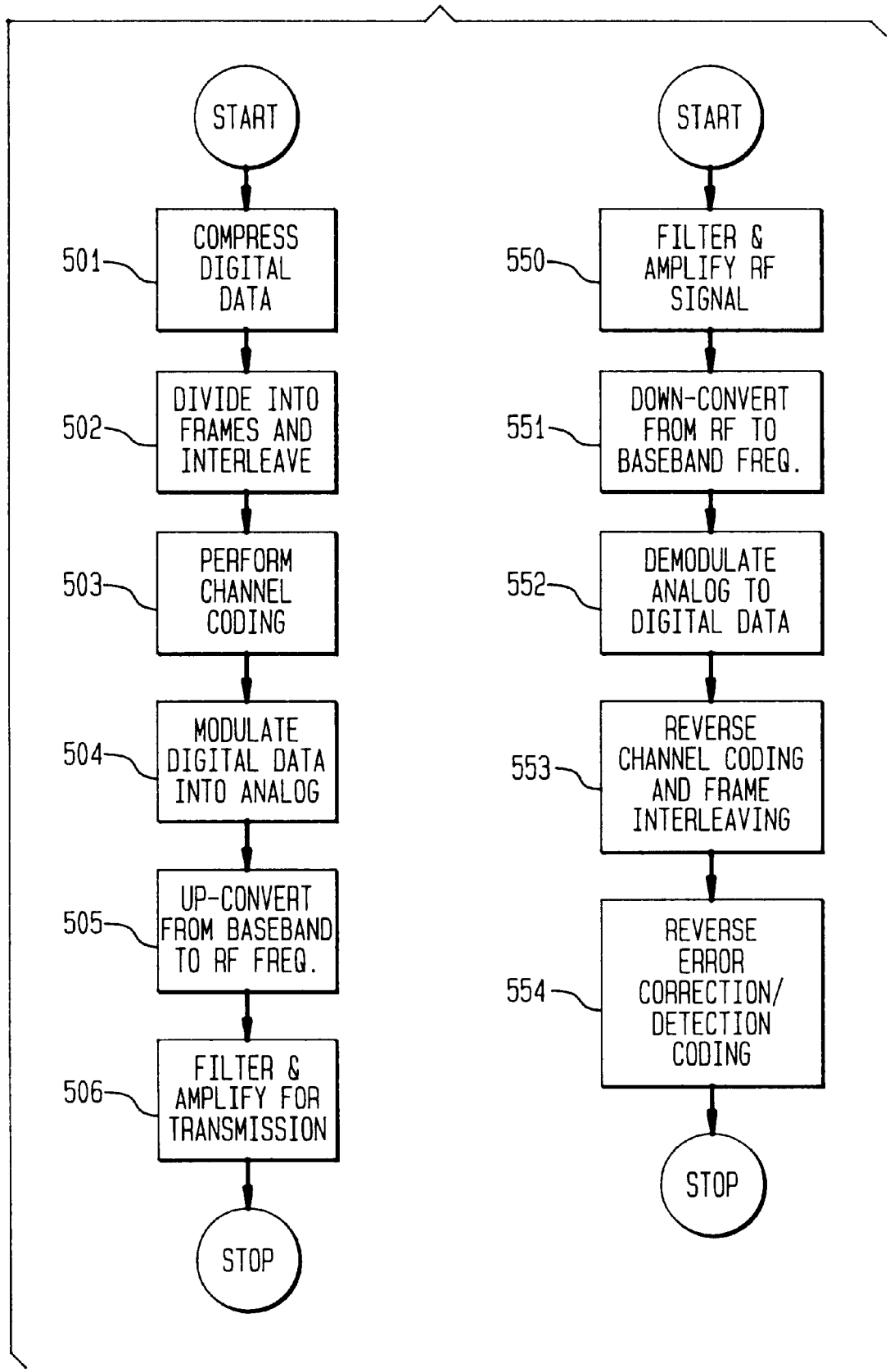
FIG. 5 shows a flow diagram of the protocol for transmitting/receiving information shown in FIG. 3.

After the traffic channel has been fully initialized, the mobile base station initiates the data transmission flow. The wireless data transfer between the mobile communication system and a user terminal may be controlled by wireless transmit/receive protocols. One embodiment of this protocol is depicted in FIG. 5. In Block 501, digital data (e.g. text, image, video) is compressed, and if necessary error detection/correction code may be added. Block 502 divides the encoded data stream into frames which may also involve interleaving data from multiple frames to protect entire frames from being destroyed by a signal fade. In Block 503, channel coding is performed on the interleaved data based on the modulation scheme used. Next, the digital data is modulated into analog waveform in Block 504. Block 505 up-converts analog waveform in baseband frequency to radio frequency (RF), and Block 506 filters and amplifies the RF signal for wireless transmission.

The reception protocol is also depicted in FIG. 5. In Block 550, the RF signal is received which also may involve filtering and amplifying it. Block 551 down-converts the analog waveform from RF to baseband frequency and Block 552 demodulates the analog signals to digital data. In Block 553, the reverse process of channel coding and frame interleaving is performed. Finally, the data is decompressed in Block 554 which may also require reversing the error correction/detection code to obtain original data.

In addition to this basic protocol, other known techniques such as call handoff, power control, dynamic bandwidth allocation may be employed to efficiently share the RF spectrum between multiple terminals/mobil base stations, and guarantee the integrity of the RF links. Such signal control is known in the art and suitable systems include AMPS, GSMC, PDC, TDMA and CDMA.

One preferred embodiment of the invention, for example, uses cellular hand-off technology to switch from one mobil base station as it leaves a particular region to another mobil base station in the region having a stronger signal. This may be performed by handing-off individual users, or by handing-off groups of users. This embodiment, however, requires that another mobil base station is in the vicinity to accept the user(s). In another embodiment, a mobil base station transmits as much information as possible while in proximity of the user and then stops when the communicative link becomes too weak. Later, when another mobil base station enters the vicinity, it may continue where the first base station left off based upon a signal from the user's terminal. To ensure that the user would eventually receive all of the information, a multitude of vehicles scheduled to travel in the area may be loaded with the same information. For example, several buses servicing the same line may be loaded with similar information for dissemination—one bus can take over where the bus in front of it left off.

The inventive system and method may be optimized for efficiency and lower cost. For example, in one preferred embodiment, the mobile base station broadcasts information common to multiple users simultaneously. Then, each user terminal only requests those frames that cannot be recovered by the error detection codes, or information particular to that user.

Until now, it has been presumed that the mobile base station is pre-loaded with the information to be dispatched. One embodiment of the invention, however, includes the presence of a control station. In one preferred embodiment, the control station serves as an information depot to provide the mobile base station with information and/or to receive information from the mobile base station. The information held by the control station may be processed on- or off-site. For example, a multimedia service may prepare specified news papers for users and then transmit the information over convention communication line to the various control station. These control station would then be responsible for delivering the information to the mobile base station which in turn deliver it to the users. This way, the control station can concentrate on its primary purpose, e.g., maintaining buses, and only act as a conduit for the information to be disseminated.

Figure 6A:
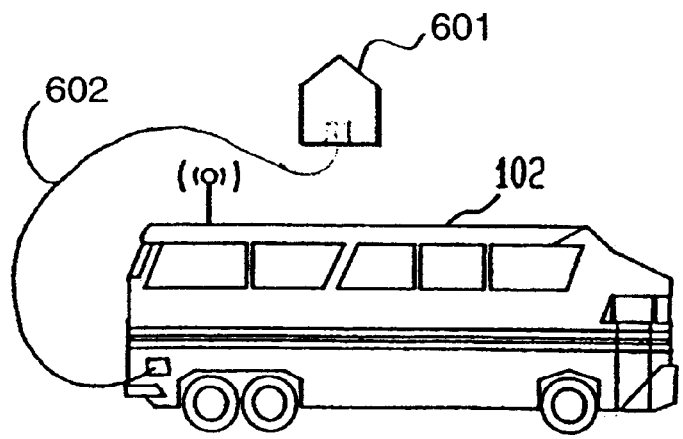
FIG. 6a shows a schematic diagram of the mobile base station downloading data from a control station over a metallic link.

Transferring information between the mobil base station and the control station may be performed in a number of ways. In one preferred embodiment, as shown in FIG. 6a, the mobile base station 102 physically docks at the control station 601 and "plugs" into it for the information transfer. Such a information transfer may occur using convention wireline means 602 such as an Ethernet, using known protocols such as FTP or TCP/IP. Although the control station may be a facility dedicated to mobile base station information transfer, in this situation it is preferable to use an existing facility that the mobile base station would ordinarily frequent in the normal course of business. For example, if the mobile base station was a public transportation bus, the control station might be the bus depot. Every morning before the bus went on its appointed rounds, information might be loaded into the mobil wireless communication unit's storage for dissemination to users along the bus path.

Figure 6B:
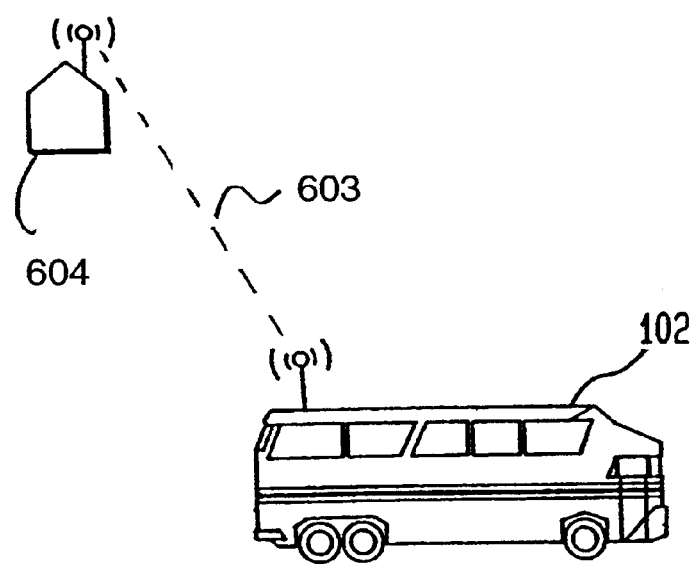
FIG. 6b shows a schematic diagram of the mobile base station downloading data from a control station over a wireless link.

In an alternative embodiment as shown in FIG. 6b, the mobile base station 102 would not be physically on-site, but rather would receive the information over a wireless link. Although conventional approaches may be used, preferably the data transfer between the control station 604 and mobile base station 102 would be performed in a similar fashion as the data transfer between the mobile base station and the terminals. Accordingly, the control station may have a wireless communication means similar to that used by the terminals such that information may be transferred between the mobile base station and the control station. This embodiment is preferred from a wireless transfer perspective because it involves no additional equipment on the mobile base station. Thus, as with the user terminals, the mobile base station would travel within a certain proximity of the control station to effect a transfer.

Obviously, numerous other modifications and variations of the present invention are possible in the light of the above teachings. It is therefore understood that within the scope of the appended claims, the invention may be practiced otherwise than as specifically described herein.

What is claimed is:

1. A method of providing a wireless medium to a stationary terminal using a mobile base station, said stationary terminal having storage means for storing information and a terminal wireless communication interface, said mobile base station having storage means and a mobile wireless communication interface adapted for wireless communication with said stationary terminal, said method comprising the steps of:

moving said mobile base station within a particular broadcast range of said stationary terminal;

establishing a wireless LAN communication link between said mobile base station and said stationary terminal; and transmitting information between said storage means of said mobile base station and said storage means of said stationary terminal via said wireless LAN communication link terminal, wherein transmitting information comprises at least the steps of compressing digital data;

dividing and interleaving said data into frames;

channel coding said frames;

modulating said coded frames into an analog waveform;

upconverting said analog waveform from baseband frequency to radio frequency (RF); and amplifying said RF signal for wireless transmission.

2. The method of claim 1, wherein said wireless LAN communication link uses a technology selected from the group consisting of frequency hopping spread spectrum technology and direct sequencing spread spectrum technology.

3. The method of claim 1, wherein said information is transmitted over a wide bandwidth.

4. The method of claim 3, wherein said information relates to a multimedia product.

5. The method as defined in claim 1, wherein information is a meter reading transferred from said stationary terminal to said mobile base station.

6. The method of claim 1, further comprising:

transferring information between a control station and said mobile base station over a second communicative link.

7. The method of claim 6, wherein said second communicative link comprises a wireline.

8. The method of claim 6, wherein said second communicative link comprises a wireless LAN link.

9. A mobile base station comprising:

a mobile vehicle;

a mobile wireless communication unit mounted on said vehicle for providing a wireless medium to a stationary terminal, said mobile wireless communication unit comprising:

mobile storage means for storing information;

a mobile wireless LAN interface for cooperating with said stationary terminal to form a wireless LAN link for transmitting information between said stationary terminal and said mobile storage means when said vehicle is within a particular broadcast range of said stationary terminal, wherein said mobile wireless LAN interface comprises at least:

means for transmitting a control signal from said mobile base station to said terminal, said control signal containing identification of said base station;

means for receiving a data link request from said terminal;

means for transmitting a second control signal informing said terminal which data channel to use;

means for receiving an information request from said terminal on said data channel; and means for transmitting information according to said
information request from said terminal.

10. The mobile base station of claim 9, wherein said
wireless LAN interface comprises a technology selected
from the group consisting of frequency hopping spread
spectrum technology and direct sequencing spread spectrum
technology.

11. The mobile base station of claim 7, wherein said
mobile wireless communication means and said terminal
wireless communication means employ cellular technology.

12. The mobile base station of claim 11, wherein said
cellular technology at least provides for a function selected
from the group consisting of hand-off, power control,
dynamic bandwidth allocation control, and combinations
thereof.

13. The method of claim 12, wherein hand-off control
involves said terminal instructing said mobile base station to
begin transmitting said information from a certain point,
said certain point corresponding to where a previous mobile
base station discontinued transmitting said information to
said terminal.

14. The mobile base station of claim 9, wherein said
mobile communication unit further comprises:
means for comparing an identification of said terminal
against a database of users to verify that said terminal
is a subscriber.

15. The mobile base station of claim 9, wherein said
mobile base station is a commercial vehicle normally scheduled to travel to said particular broadcast range.

16. The mobil base station of claim 15, wherein said
commercial vehicle is selected from the group consisting of
public transportation vehicles, school buses, delivery
vehicles, municipal vehicles, taxi cabs, and combinations
thereof.

17. A mobile wireless communication unit for providing
a wireless medium to a stationary terminal having terminal
storage means and terminal wireless communication means,
said mobile wireless communication unit comprising:
means for mounting the unit to a mobile vehicle;
mobile storage means for storing information; and
mobile wireless LAN interface for cooperating with said
terminal communication means to form a LAN wireless
link for transmitting information between said terminal
storage means and said mobile storage means when
said mobile vehicle is within a certain broadcast range
of said stationary terminal, said mobile wireless LAN
interface comprising at least:
means for compressing digital data;
means for dividing and interleaving said data into
frames;
means for channel coding said frames;
means for modulating said coded frames into an analog
waveform;
means for upconverting said analog waveform from
baseband frequency to radio frequency (RF); and
means for amplifying said RF signal for wireless transmission.

18. The mobile wireless communication unit of claim 17,
wherein said wireless LAN communication link uses a
technology selected from the group consisting of frequency
hopping spread spectrum technology and direct sequencing
spread spectrum technology.

19. The mobile wireless communication unit of claim 17,
wherein said mobile wireless LAN interface and said terminal wireless communication means employ cellular technology.

20. The mobile wireless communication unit of claim 19,
wherein said cellular technology at least provides for a
function selected from the group consisting of hand-off,
power control, dynamic bandwidth allocation control, and
combinations thereof.

21. A method of providing a wireless medium to a
stationary terminal using a mobile base station, said stationary terminal having a terminal computer-readable storage
medium and a terminal wireless communication interface,
said mobile base station having a mobile computer-readable
storage medium and a mobile wireless communication interface adapted for wireless LAN communication with said
terminal wireless communication interface within a particular broadcast range, said method comprising:
moving said mobile base station within said particular
broadcast range of said stationary terminal;
establishing a wireless LAN communication link between
said mobile base station and said stationary terminal,
wherein establishing said wireless LAN communication link and transmitting said information comprises
the steps of:
transmitting a control signal from said mobile base
station to said stationary terminal, said control signal
containing identification of said base station;
receiving a data link request from said stationary terminal;
transmitting a second control signal informing said
stationary terminal which data channel to use;
receiving an information request from said stationary
terminal on said data channel; and
transmitting information according to said information
request from said stationary terminal; and
transmitting information between said terminal computer-readable storage medium and said mobile computer-readable storage medium over said wireless LAN communication link.

22. The method of claim 21, further comprising the step
of:
comparing an identification of said terminal against a
database of users to verify that said terminal is a
subscriber.

23. A mobile base station comprising:
a mobile vehicle;
a mobile wireless communication unit mounted to said
mobile vehicle for providing a wireless medium to a
stationary terminal, said mobile wireless communication unit comprising:
mobile storage means for storing information; and
wireless communication means for cooperating with
said stationary terminal to form a wireless LAN
communication link for transmitting information
between said mobile storage means and said stationary terminal when said vehicle is within a particular
broadcast range of said stationary terminal, wherein
said wireless communication means comprises:
means for compressing digital data;
means for dividing and interleaving said data into
frames;
means for channel coding said frames;
means for modulating said coded frames into an
analog waveform;
means for upconverting said analog waveform from
baseband frequency to radio frequency (RF); and
means for amplifying said RF signal for wireless
transmission.

24. A mobile wireless communication unit for providing
a wireless medium to a stationary terminal having terminal
storage means and terminal wireless communication means,
said mobile wireless communication unit comprising:

means for mounting the unit to a mobile vehicle;

mobile storage means for storing information; and wireless communication means mounted to said housing for cooperating with said terminal communication means to form a wireless LAN communication link for transmitting information between said terminal storage means and said mobile storage means when said vehicle is within a particular broadcast range of said stationary terminal, wherein said mobile wireless communication means comprises:

means for transmitting a control signal from said mobile base station to said stationary terminal, said control signal containing identification of said base station;

means for receiving a data link request from said stationary terminal;

means for transmitting a second control signal informing said stationary terminal which data channel to use;

means for receiving an information request from said stationary terminal on said data channel; and means for transmitting information according to said information request from said stationary terminal.

25. The mobile wireless communication unit of claim 24, wherein said mobile communication unit further comprises:

means for comparing an identification of said terminal against a database of users to verify that said terminal is a subscriber.

* * * * *